(No Model.) 2 Sheets—Sheet 2.
C. NITTINGER.
FIRE ESCAPE.
No. 419,542. Patented Jan. 14, 1890.
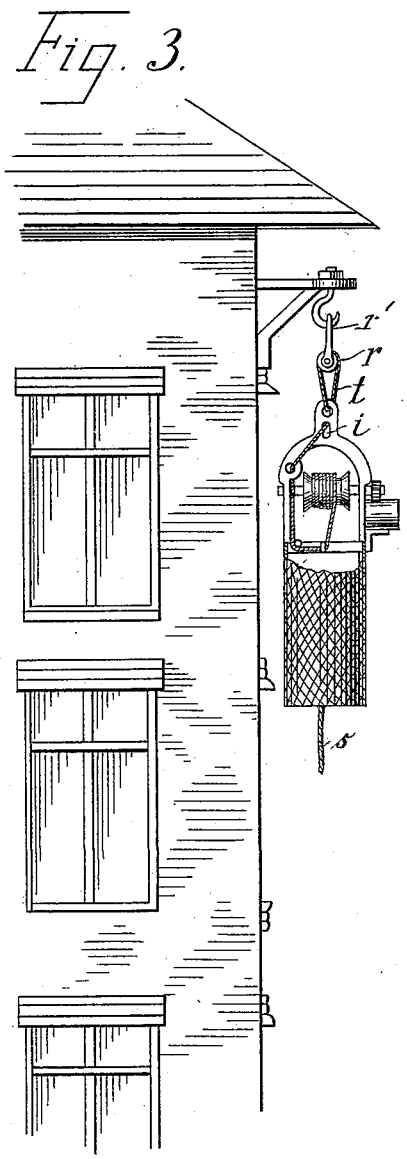
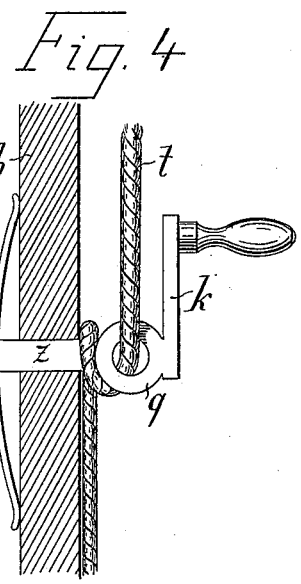
Witnesses:
F. L. Durand
Bennett S. Jones
Inventor:
Carl Nittinger,
by Souis Bagger & Co.,
Attorneys.
N. PETERS, Photo-Lithographer, Washington, D. C.

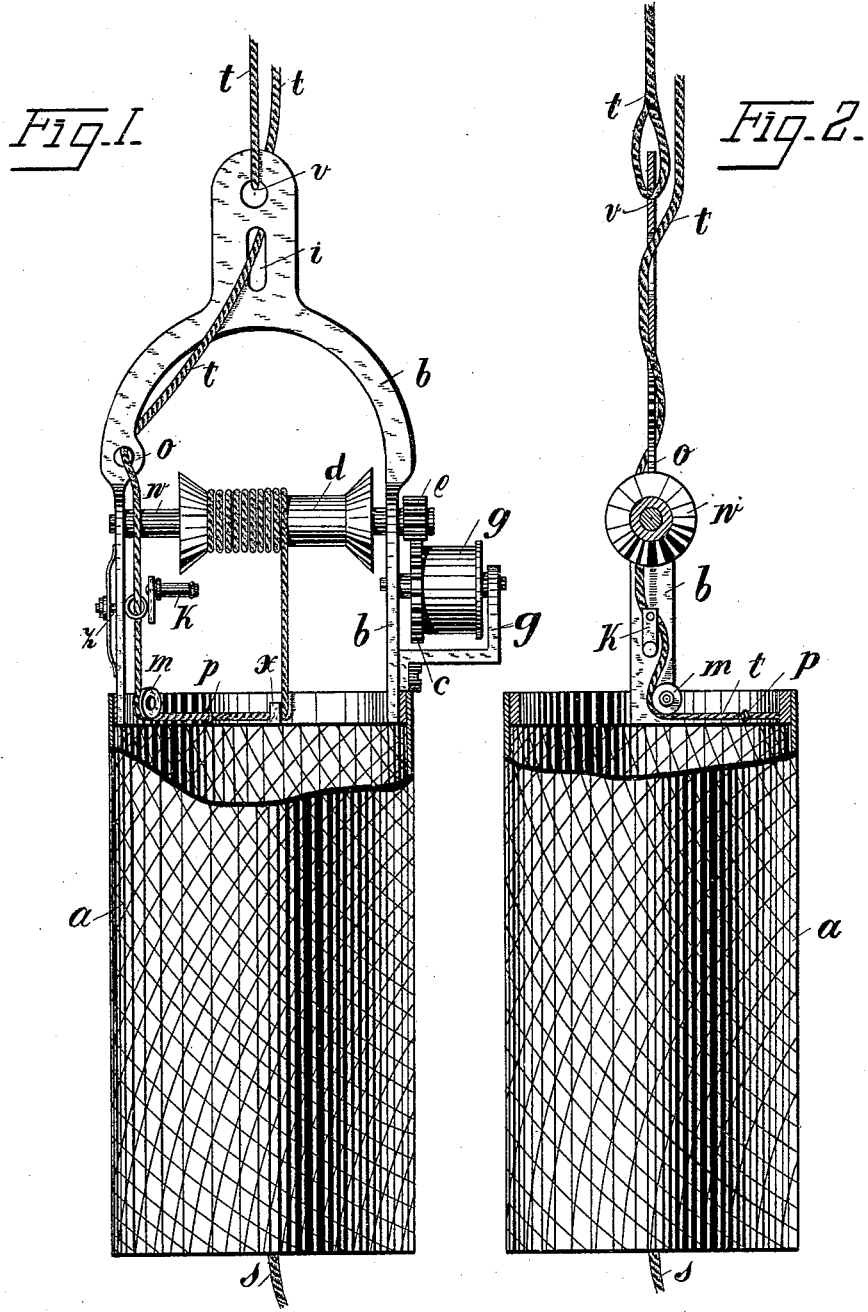

UNITED STATES PATENT OFFICE.

CARL NITTINGER, OF LANGENSALZA, PRUSSIA, GERMANY.

FIRE-ESCAPE.

SPECIFICATION forming part of Letters Patent No. 419,542, dated January 14, 1890.

Application filed October 29, 1889. Serial No. 328,528. (No model.)

*To all whom it may concern:*

Be it known that I, CARL NITTINGER, of Langensalza, in the Kingdom of Prussia and German Empire, have invented certain new and useful Improvements in Fire-Escapes, of which the following is a specification.

My invention relates to that class of fire-escapes in which a basket or cage is raised or lowered by means of a rope or cable passing over a pulley affixed to a building in proximity to a window or other accessible point.

The object of the invention is to provide such a fire-escape in which the basket or cage is automatically elevated to its proper position after it has been lowered to discharge its load, thereby dispensing with the necessity of raising it by hand, as is ordinarily done, thus effecting a saving in time and labor, which is of very great importance when fires are raging.

The invention also has for its object to provide means for checking or retarding the motion of the basket or cage in case of its descending too quickly, and also for stopping the said basket or cage at any point desired.

The invention consists, essentially, of a basket or cage which is secured to a suitable bail or frame, in which is journaled a shaft having a drum and a spring-barrel which is geared to the shaft of the drum, so that movement is communicated from one to the other. Secured to this drum is a rope or cable, which passes over pulleys secured to the basket or cage, through an eye or slot in the bail or frame, and over a pulley located on the outside of a building, and then back to the bail or frame, where it is secured. This rope also passes through a ring in a crank-shaft secured to the frame, whereby the descent of the basket or cage may be checked or stopped by turning the crank and rotating the shaft.

In the accompanying drawings, Figure 1 represents a front elevation of an apparatus constructed according to my invention. Fig. 2 is a side elevation of the same. Fig. 3 represents the apparatus attached to or connected with a building ready for use. Fig. 4 is an enlarged view of the brake for preventing the too rapid descent of the cage.

In the said drawings the reference-letter $a$ designates the cage or basket, which is preferably made of woven wire, but which may be made of any other suitable material. Firmly secured to this cage or basket is the bail or frame $b$, consisting of the two vertical side arms connected by a bowed or curved cross-piece, having an upwardly-projecting lug or arm to which one end of the elevating rope or cable is secured. Journaled in the side arms of the bail or frame is a shaft $w$, having a drum $d$ rigidly mounted thereon. At one end of shaft $w$ is secured a pinion $e$, which meshes with a gear-wheel $c$, secured to the spring-barrel $g$. One end of the shaft of the spring-barrel is journaled in the frame $b$, while the other is journaled in a bent arm $g'$, secured to said frame, as clearly seen in Fig. 1.

$t$ designates the hoisting or elevating rope. One end of the rope is secured to the drum $d$, and is wound thereon by the ascent of the basket and unwound on its descent, as will hereinafter be set forth. From this drum the rope passes through a lug $x$, over pulley $m$ on the basket, through eye or ring $q$ of shaft $z$, through eyes or slots $o$ and $i$ of the frame, to and over pulley $r$, secured by means of a sling $i'$, or otherwise, to a building. From said pulley it passes to the upper end of the frame, to which it is secured.

My improved brake mechanism consists of a shaft $z$, journaled in one of the side arms of the frame, and is provided with a ring $q$, through which the hoisting-rope passes, and with a crank or handle $k$.

I have not shown the spring by which the spring-barrel $g$ is actuated, as it may be of any ordinary construction, and as such are well known no detailed description is necessary, it being sufficient to say that the spring should be powerful enough to overcome the gravity of the basket or cage and its connections.

The operation is as follows: The basket or cage in its normal position is elevated to the top of the building by means of the spring in barrel $g$ winding the rope or cable upon the drum $d$, as will be readily understood. In case of fire the occupants of the building jump into the cage or basket, causing the cable to be unwound from the drum and the cage or basket to descend. Should the load be too heavy and the basket descend too rapidly, its descent may be retarded and regulated by turning the handle $k$, which causes the rope to be wound upon shaft $z$, (see Fig. 4,) as will be obvious. When the basket has reached the ground and discharged its load, it will be elevated to its normal position automatically by reason of the tension of the spring in the spring-barrel, said spring having been wound up by the descent of the basket.

From the above it will be seen that my invention provides a very simple and efficient apparatus to be used in case of fire, whereby the occupants of a burning building may be removed with celerity and safety, and much time and labor usually expended in operating fire-escapes be saved.

Having thus described my invention, what I claim is—

1. The combination, with the basket $a$, of the frame $b$, the shaft $w$, drum $d$, pinion $e$, gear-wheel $c$, spring-barrel $g$, rope $t$, lug $x$, pulley $m$, eyes or slots $o$ and $i$, and pulley $r$, substantially as described.

2. The combination, with basket $a$, frame $b$, and drum $d$, of the shaft $z$, having ring $q$ and handle $k$, substantially as and for the purpose described.

In witness whereof I have hereunto set my hand in presence of two witnesses.

CARL NITTINGER.

Witnesses:
FRANZ HEMMANN,
PAUL FISCHER.